United States Patent Office 3,328,393
Patented June 27, 1967

3,328,393
METHOD OF PRODUCING ω-LACTAMS
Giuseppe Ribaldone, Gallarate, Varese, and Adriano Nenz and Corrado Brichta, Milan, Italy, assignors to Montecatini Edison S.p.A., Milan, Italy
No Drawing. Filed July 29, 1964, Ser. No. 386,082
Claims priority, application Italy, July 31, 1963,
15,965/63
14 Claims. (Cl. 260—239.3)

---

ABSTRACT OF THE DISCLOSURE

Process for producing ω-lactams such as caprolactam by reacting cycloalkanecarboxylic acids (e.g. cyclohexanecarboxylic acid) with molecular nitrosyl hydrogen pyrosulfate having the formula $NOHS_2O_7$. The reaction is carried out by combining the molecular nitrosyl hydrogen pyrosulfate with the cycloalkanecarboxylic acid in a liquid phase at a relatively low temperature between 30° C. and 150° C.; the cycloalkanecarboxylic acid has a ring containing from 4 to 12 carbon atoms, inclusive, and may be dissolved in aliphatic, cycloaliphatic and chlorinated aliphatic hydrocarbons and nitroparaffines, the molar ratio of the cycloalkane to the carboxylic acid being substantially between 0.5 and 2.

---

Our present invention relates to a process for the production of ω-lactams and, more particularly, to a method of producing such lactams from cycloalkanoic acids.

It has been a common practice in the production of ω-lactams, which can generally be characterized by the formula:

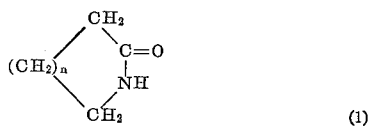

(1)

where n is an integer, to cyclize the corresponding amino acid and produce the cyclic amide corresponding thereto. Such cyclic amides or lactams have found considerable use in the production of polyamide synthetic resins (e.g. of the nylon type) for fibers, films, sheets and molded bodies. A less common prior method of producing lactams is by the treatment of a cycloalkanecarboxylic acid with a nitrosating agent such as nitrosyl hydrogen sulfate, nitrosyl chloride or gases containing nitrogen oxides and, especially, nitrous oxide. In order to activate these nitrosating agents, it has been the practice to employ sulfuric acid, sulfur trioxide or its polymers, and/or oleum ($H_2SO_4 \cdot SO_3$) in the reaction system. This system can be used to produce caprolactam by reacting cyclohexanoic acid with nitrosyl hydrogen sulfate in the presence of sulfur trioxide and a nitro-paraffin solvent.

For the purposes of the present invention, an ω-lactam will be defined as a cyclic amide having the general Formula 1 given above, while the amide group

—CO—NH— connects two carbon atoms which are proximal to one another although at opposite ends of a chain, regardless of the number of carbon atoms between the two carbon atoms bearing the amide group. The proximity of the two carbon atoms to one another derives from the fact that these carbon atoms were both originally beta to the carboxylic acid group.

All of the prior-art methods of producing ω-lactams requiring activators for the nitrosating agent, have been characterized by the presence of sulfuric acid or sulfuric acid anhydride (sulfur trioxide) in considerable quantities so that the reaction involved both a substantial consumption of sulfuric acid, oleum and/or sulfur trioxide, and a substantial equivalent consumption of alkali to neutralize the acidity corresponding to the total acid present. The alkali may be ammonia or alkali-metal hydroxide so that, upon neutralization, considerable quantities of the corresponding sulfate salt is produced. The excess acid and the large quantities of alkali increase the total volume of the mass from which the desired lactam is to be removed, thereby increasing the problem of extraction. Moreover, in order for the process to be economical, provision must be made to recover the sulfates, while care is required to obtain the maximum yield of the lactam by extraction from the lactam-containing mixture which is diluted during neutralization.

The strong exothermicity of the nitrosation reactions carried out by the conventional processes described above is also disadvantageous because of the necessity of providing means for dispersing the reaction heat, preventing hot spots from developing, and maintaining the desirable thermal conditions for the reaction.

The presence of sulfuric-acid anhydride in the reaction medium reduces the yield of caprolactam and thus the efficiency of the conversion of the cycloalkanoic acid to the ω-lactam. The low yields are the result, in part, of the formation of sulfur-containing organic byproducts whose production cannot be adequately eliminated by the conventional techniques.

It is, therefore, the principal object of the present invention, to provide an improved method of producing ω-lactams wherein the aforementioned disadvantages can be avoided.

Still another object of this invention is to provide an improved method of producing ω-lactams from cycloalkanecarboxylic acids in high-yield and with good conversion of the cycloalkanecarboxylic acid.

It is a further object of this invention to provide a process of the character described which involves no difficulty in maintaining the desirable reaction temperature and thermal conditions.

The above objects and others which will become apparent hereinafter can be obtained, in accordance with the present invention, by a method of producing ω-lactams which comprises the step of reacting a cycloalkanecarboxylic acid with nitrosyl hydrogen pyrosulfate ($NOHS_2O_7$)

We have found that, surprisingly, nitrosylhydrogen pyrosulfate is an excellent substance for the nitrosation of cycloalkanecarboxylic acids and does not require free sulfur trioxide or sulfur trioxide in the form of oleum to ensure an economical reaction rate and a high yield relative to the quantity of the starting carboxylic acid. Moreover, the neutralization of the reaction mass requires only sufficient alkali to neutralize an acidity equivalent to that of the reacted carboxylic acid or nitrosyl hydrogen pyrosulfate since the products of the reaction include pyrosulfuric acid, which is formed in molar quantities equal to the consumption of nitrosyl hydrogen pyrosulfate. The excess acidity of oleum and sulfur trioxide, present in earlier processes for producing ω-lactams, is not a factor in the process of the present invention.

The nitrosyl hydrogen pyrosulfate is a new product believed to be a true nitrosyl salt corresponding to the formula $$NOHS_2O_7 \qquad (2)$$

and is described and claimed in commonly assigned copending application Ser. No. 375,621 filed June 16, 1964 by Giuseppe Ribaldone, Franco Smai and Carmine Garbuglio and entitled "Nitrosyl Hydrogen Pyrosulfate." The product is characterized by the empirical formula $HNS_2O_8$ and the structural formula given above. The compound possesses a reactive nitrosyl group in combination with the structure normally deemed to constitute a pyrosulfate group. The compound has a high thermal stability and in fact can be heated to temperatures up to about 200° C. without appreciable decomposition or elimination of the nitrosyl group. Cooling of the melted product again produces the chemical entity without any appreciable variation either in the empirical or the apparent structural formula. The product is further characterized by a melting point substantially in the range of 114°–116° C. and has a white crystalline appearance. It is strongly hydroscopic and decomposes in the presence of water to sulfuric acid and nitrogen oxide. The compound is, moreover, soluble in concentrated sulfuric acid and reacts violently with acetic anhydride yielding hydrogen cyanide. Chemical analysis of the product in terms of NO and $SO_4$ has given, on the average, about 14% by weight NO and about 93% by weight $SO_4$.

In addition to the fact that the reaction mass resulting from the present process is substantially smaller than the mass involved when oleum or sulfur trioxide is used, an advantage of the present invention resides in the fact that the nitrosyl hydrogen pyrosulfate and the pyrosulfuric acid formed in the course of the reaction do not appear to be nearly as active in sulfonating and fragmenting the organic starting compounds (i.e. the cycloalkanoic acid) or the solvent as is the sulfur trioxide or oleum employed heretofore. The use of nitrosyl hydrogen pyrosulfates enables the expedients heretofore proposed for the regulation of the thermal conditions of the reaction to be dispensed with. The reaction, according to the present invention, is moderately exothermic as contrasted with the high exothermicity of the earlier systems so that the reaction can be carried out even at relatively low temperatures (accompanied by a corresponding low reaction rate); the heat evolution of the reaction is, however, sufficient to ensure a continual and gradual increase in the reaction rate without a tendency to produce hotspots or the like. As indicated earlier, the quantities of alkali (i.e. alkali-metal hydroxides or carbonates or ammonium hydroxide) is substantially less because of the absence of sulfuric acid and sulfur trioxide. It is concomitantly less necessary to recover the salts produced by the neutralization reaction.

According to another feature of the present invention, the reaction is carried out by adding nitrosyl hydrogen pyrosulfate in the solid state slowly to the cycloalkanecarboxylic acid which is in a liquid phase. The reaction can, however, be carried out by intimately mixing nitrosyl hydrogen pyrosulfate and the solid carboxylic acid in the solid phase although it is preferred that sufficient heat be provided either by the exothermic reaction or some other source of energy, to enable the acid to go into solution. The solvent can be the acid itself at a temperature slightly above the melting point thereof, although it is contemplated in accordance with this invention, to dissolve the cycloalkanoic acid in an inert solvent to which the solid nitrosyl hydrogen pyrosulfate is subsequently added. The use of the solvent is preferred when cycloalkanoic acids, which are solid at the desired temperature, are used.

The reaction of the nitrosyl hydrogen pyrosulfate with the cycloalkanoic acid tends to go to completion because of the evolution of carbon dioxide which drives the reaction in the forward direction in spite of the formation of the pyrosulfuric acid which remains in the reaction mixture. The reaction can be represented by the formula

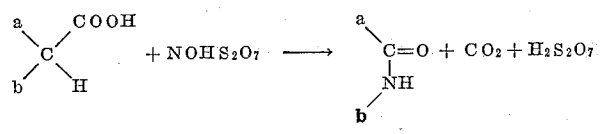

where $a$ and $b$ represent the valences of carbon atoms connected only to one additional carbon atom in a saturated straight or branched hydrocarbon chain. The monocarboxylic cycloaliphatic acid can have a ring of 4–12 carbon atoms when the carboxylic acid is represented as follows:

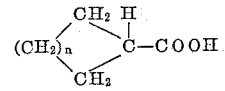

The ω-lactams will have the Formula 1 given above, in which case $n$ will be an integer ranging from 2–9. The chain $(CH_2)_n$ can, however, be branched at one or more locations with a corresponding number of hydrogen atoms replaced by alkyl groups.

It is evident, therefore, that the present invention is applicable to cycloaliphatic monocarboxylic acids such as cyclopentanoic acid, cyclohexanoic acid, cycloheptanoic acid, cyclooctanoic acid, cyclohendecanoic acid and cyclododecanoic acid as well as the alkyl-substituted derivatives thereof, e.g. 4-methylcyclohexanecarboxylic acid.

Although it has been found that a wide range of molar ratios of the cycloaliphatic carboxylic acid to nitrosyl hydrogen pyrosulfate is operative, best results require a molar ratio between them of substantially 0.5 to 2, depending upon the desired conversion of the carboxylic acid. We have noted, however, that it is most desirable to operate with molar ratios of approximately unity. A reaction temperature on the order of 50° C., i.e. from 40° to 60° C., has been found to give best results, although the operable temperature range extends from 30°–150° C. When it is desired to carry out the reaction in liquid phase at temperatures below the melting point of the cycloalkanecarboxylic acid, inert solvents of the aliphatic and cycloaliphatic hydrocarbon series can be used. Suitable solvents of this type include pentane, hexane and their cyclic counterparts such as cyclopentane and cyclohexane. Other operative solvents include chlorinated aliphatic hydrocarbons, e.g. carbon tetrachloride, dichloroethane and its homologs and nitroparaffins such as nitromethane, nitrocyclohexane, nitropropane, etc.

It has been found to be preferable to carry out the reaction by adding the solid nitrosyl hydrogen pyrosulfate gradually to the cycloalkanecarboxylic acid or a solution thereof in one of the inert solvents mentioned above with vigorous stirring. At the end of the reaction, the mass is cooled, e.g. by adding ice water, and treated in such manner as to separate the various components of the reaction mass. The separation of the components can be carried out by solvent extraction with, for example, ether. The etheral extract is evaporated to recover unreacted cycloaliphatic carboxylic acid while the aqueous phase, after neutralization with an alkali, is extracted with a solvent such as benzene, chloroform or methylene chloride. Evaporation of this solvent extract yields the ω-lactam which can be purified in the conventional manner by distillation or recrystallization. Alternatively, the process can be reversed and the solvent extraction of the ω-lactam carried out on the neutralized reaction mass with the ether extraction of unreacted cycloaliphatic carboxylic acid being effected subsequently. The ω-lactams produced by this process, e.g. valerolactam, caprolactam, capryl-lactam, lauryl-lactam, etc. are excellent intermediates for the production of polyamide resins for fibers, films and molding compounds.

The invention will be more fully apparent from the following specific examples of preferred processes for the production of ω-lactams. The specific examples are given for purposes of illustration of those techniques and proportions found most advantageous and are not to be considered limiting of the broader aspects of the invention disclosed.

The nitrosyl hydrogen pyrosulfate is preferably prepared by the methods disclosed in the commonly assigned copending application, Ser. No. 375,621, filed June 16, 1964, and entitled "Process for Preparing Nitrosyl Hydrogen Pyrosulfate." Essentially, the preparation reaction may be considered in terms of the substantially equimolar sulfonation of nitrosyl hydrogen sulfate ($NOHSO_4$) by a sulfonating agent containing the $SO_3$ group. A suitable sulfonating agent is monomeric sulfur trioxide ($SO_3$); other suitable sulfonating agents include the polymeric form of sulfur trioxide and, more suitably, chlorosulfonic acid ($ClSO_3H$). The following is a specific example of the preparation of nitrosyl hydrogen pyrosulfate as used for the present purposes.

Into a 100 cc. distillation flask equipped with a reflux condenser, dropping funnel for the introduction of liquids, and ground-glass couplings lubricated with polyphosphoric acid, 24.6 g. (0.193 mole) of nitrosyl hydrogen sulfate was introduced.

Keeping the flask externally cooled by a cold water bath, 24.1 g. (0.301 mole) of sulfur trioxide, stabilized with 1% by weight of carbon tetrachloride were introduced during a period of 5 minutes. The flask and reaction mixture was then permitted to stand overnight and the solid mass thereby formed was removed and very finely ground in a "dry-box." The powder thus obtained was then heated at 60°–70° C. and a reduced pressure corresponding to 10 mm. Hg, in order to eliminate the excess sulfur trioxide. 39.3 g. (0.19 mole) of a substance with a melting point of 114° C.–116° C. were obtained. The melting point of the substance in admixture with nitrosyl hydrogen sulfate was 50°–53° C.

The analysis by weight gave the following results:

found: NO percent=13.51, $SO_4$ percent=93.09
calculated for $NOHS_2O_7$: NO percent=14.48, $SO_4$ percent=92.75

The yield calculated on the base of the proposed formula $NOHS_2O_7$ was 98%.

The nitrosyl hydrogen pyrosulfate has a characteristic X-ray spectrum which is independent of the method by which it is produced. In the spectrum of the compound, the reticular distance is given in terms of Angstrom units while the relative intensity is that obtained visually. The X-ray spectrum was determined by using a Debye-Scherrer chamber having a diameter of 114.83 mm. and $CuK_\alpha$ radiation. From the data recorded in the table it will be evident that peaks characteristic of both the nitrosyl group and the pyrosulfate group are present so that the product has the theoretical or apparent structural formula $NO—HS_2O_7$.

TABLE

| Reticular distance (Angstrom units): | Relative intensity |
|---|---|
| 4.84 | Weak. |
| 4.37 | Strong. |
| 4.21 | Do. |
| 3.95 | Medium. |
| 3.52 | Strong. |
| 3.32 | Medium. |
| 3.25 | Do. |
| 3.13 | Strong. |
| 3.00 | Weak. |
| 2.692 | Medium. |
| 2.396 | Weak. |

*Example I*

Into a three-neck 250 ml. flask fitted with a mechanical stirrer, a reflux condenser and a dosimeter for gradually adding solids, 40 grams (0.312 mole) of hexahydrobenzoic acid (i.e. cyclohexanoic acid with a melting point=30–31° C.) dissolved in 20 ml. of cyclohexane was introduced gradually.

The solution was heated up to 65–70° C. and, via the dosimeter for solids, 80 grams (0.386 mole) of nitrosyl hydrogen pyrosulfate (with a M.P.=114°–116° C.), prepared as specifically indicated above, were gradually added to the solution in the flask. After the initial portions of nitrosyl hydrogen pyrosulfate had been added, the development of bubbles of carbon dioxide was observed. The supply rate of the nitrosyl hydrogen pyrosulfate was thereupon adjusted in such manner as to maintain the reaction mixture at a temperature of 40–45° C. The time required for completing the addition of the nitrosyl hydrogen pyrosulfate was about 2 hours. Stirring and heating at 40°–45° C. were maintained until the production of gas ceased. Furthermore, by means of starch-iodide paper, the disappearance of the $NO^+$ ion from the reaction mass was ascertained. The reaction mass was then cooled, admixed with cold water and extracted with ethyl ether.

After drying of the extract on anhydrous sodium sulfate and after evaporation of the solvent, an oily residue of 3.7 grams containing 95% by weight of unreacted hexahydrobenzoic acid, was obtained. Thus, the conversion of the hexahydrobenzoic acid amounted to 91.2% by weight. The solution was neutralized with an aqueous 10% solution of sodium hydroxide and subsequently brought to a pH of 7–7.5 with a saturated aqueous solution of sodium bicarbonate. The solution was then extracted with chloroform and the extract was then dried on anhydrous sodium sulfate and evaporated. As a residue, 27 grams (0.239 mole) of ε-caprolactam with a M.P.=62°–65° C. were obtained.

The yield in ε-caprolactam, calculated with respect to hexahydrobenzoic acid was 83.9% by weight.

*Example II*

Into the same apparatus as described in Example I and operating in the same manner, 20 grams (0.156 mole) of hexahydrobenzoic acid and subsequently, at a temperature of 70° C., 36.9 grams (0.178 mole) of nitrosyl hydrogen pyrosulfate were introduced. The nitrosyl hydrogen pyrosulfate was produced as indicated above.

The supply rate for the $NOHS_2O_7$ was then adjusted in such a way as to keep the reaction mixture at a temperature of 50°–55° C. Feeding time amounted to about 3 hours.

Stirring and heating at 50°–55° C. were continued until the development of carbon dioxide ceased. The reaction mass was thereupon cooled, diluted with water and ice, and extracted with ether. The extraction process described in Example I was then followed and 11.5 grams (0.102 mole) of ε-caprolactam with a M.P.=60°–65° C. and 3.4 grams (0.0266 mole) of unreacted hexahydrobenzoic acid were obtained.

The conversion of the hexahydrobenzoic acid was found to be 83.4% while the yield in ε-caprolactam, calculated with respect to the reacted hexahydrobenzoic acid, was 78.5%.

*Example III*

Following the same procedure and using the same apparatus described in Example I, 21 grams (0.1625 mole) of hexahydrobenzoic acid were introduced into the apparatus. The reaction temperature was then brought up to 100° C. and, at this temperature and with vigorous stirring, 40 grams (0.193 mole) of nitrosyl hydrogen pyrosulfate (prepared as described above) were gradually added over a period of 2 hours. Stirring and heating at 100° C. were maintained for another hour. By extracting the reaction mixture as described in Example I, 3.3 grams (0.0258 mole) of hexahydrobenzoic acid and 11.6 grams (0.1025 mole) of caprolactam, having a slight-brown coloration, of M.P. 60–65° C. were obtained.

The yield in caprolactam as based upon the reacted hexahydrobenzoic acid was 75.1%.

*Example IV*

Into the same equipment described in Example I and operating in substantially the same way, 20 grams (0.128 mole) of cyclooctanecarboxylic acid (having a B.P. of 142–145° C./11 mm. Hg) were introduced into the apparatus and then, at a temperature of 70–75° C., 27 grams (0.130 mole) of nitrosyl hydrogen pyrosulfate were gradually added. The supply rate was then adjusted so as to maintain the reaction mixture at a temperature of 50–55° C. Stirring and heating were continued for several hours until the production of carbon dioxide stopped. The cooled reaction mixture was thereupon diluted with cold water, neutralized to a pH of 7–7.5 and extracted with methylene chloride.

Extracting the reaction mixture as described in Example I, 12 grams (0.085 mole) of capryl-lactam with a M.P.=71–76° C. and 3.6 grams (0.023 mole) of unreacted cyclooctanecarboxylic acid were obtained. The conversion of the cycloalkanecarboxylic acid amounted to 82% by weight. The yield in capryl-lactam, as calculated with respect to the reacted cyclooctanecarboxylic acid, amounted to 81% by weight.

*Example V*

Into the apparatus as described in Example I and following the same procedure, a solution of 18 grams (0.158 mole) of cyclopentanecarboxylic acid (with a boiling point=115°/15 mm. Hg) in 10 cc. of carbon tetrachloride was introduced. Then 36 grams (0.174 mole) of nitrosyl hydrogen pyrosulfate were supplied, gradually adjusting the temperature so that it does not exceed 50°–55° C. This operation required 2 hours. Thereupon, stirring and heating at 50°–55° C. were maintained until formation of carbon dioxide stopped and any trace of $NO^+$ ions disappeared from the reaction mass. After cooling, the reaction mass was then treated with cold water and then further extracted as indicated in Example I, 6.9 grams (0.0696 mole) of pure valerolactam with a B.P.=107–109° C./2 mm. Hg and a M.P.=39°–40° C. and 6.8 grams (0.0595 mole) of unreacted cyclopentanecarboxylic acid were thus obtained.

The yield in distilled valerolactam, calculated with respect to the reacted cyclopentanecarboxylic acid, was 71%.

*Example VI*

Into the apparatus described in Example I and using the same procedures, a solution of 20 grams (0.094 mole) of cyclododecanecarboxylic acid (with a M.P.=96–97° C.) in 20 cc. of cyclohexane was introduced. Keeping the reaction mass at 70° C., 23 grams (0.111 mole) of nitrosyl hydrogen pyrosulfate were added gradually. Once carbon dioxide started to develop, the supply rate of the nitrosyl hydrogen pyrosulfate was adjusted so as to keep the temperature at about 50–55° C. When addition of nitrosyl hydrogen pyrosulfate was completed, stirring and heating at 50–55° C. was maintained for several additional hours. The reaction mixture was then cooled down, cold water was added to it and it was subsequently neutralized to a pH=7–7.5. The resulting precipitate was extracted with methylene chloride and the extract was then dried on anhydrous sodium sulfate and evaporated. A crystalline, slightly yellowish white residue was obtained weighing 14.5 grams (0.0734 mole) of lauryl-lactam having a M.P.=148–149° C.

The aqueous solution was then acidified with diluted sulfuric acid and extracted with methylene chloride, after drying on anhydrous sodium sulfate and after evaporation of the solvent, 1 gram (0.0047 mole) of unreacted cyclododecanecarboxylic acid was obtained.

The conversion of the cyclododecanecarboxylic acid was 95% while the yield in lauryl-lactam, calculated with respect to the reacted cyclododecanecarboxylic acid was 82.2%.

*Example VII*

The method of Example I was followed except that the cyclohexanoic acid thereof was replaced by an equivalent molar quantity of cycloheptanoic acid. The corresponding ω-lactam was produced in a yield approximating that of Example I.

*Example VIII*

The method of Example IV was followed except that the cyclohexanoic acid thereof was replaced by an equivalent molar quantity of cyclohendecanoic acid. The corresponding ω-lactam was produced in a yield approximating that of Example IV.

*Example IX*

The method of Example IV was followed except that the cyclohexanoic acid thereof was replaced by an equivalent molar quantity of cyclodecanoic acid. The corresponding ω-lactam was produced in a yield approximating that of Example IV.

*Example X*

The method of Example VIII was followed except that the cyclohexanoic acid thereof was replaced by an equivalent molar quantity of 4-methylcyclohexanecarboxylic acid. The corresponding ω-lactam was produced in a yield approximating that of Example IX.

We claim:

1. A process for producing ω-lactams, comprising the step of reacting, in the absence of free sulfuric acid and sulfur trioxide, a cycloalkanecarboxylic acid with molecular nitrosyl hydrogen pyrosulfate having the formula $NOHS_2O_7$.

2. A process as defined in claim 1 wherein said cycloalkanecarboxylic acid is in liquid phase and said nitrosyl hydrogen pyrosulfate is added as a solid to said liquid phase.

3. The process defined in claim 1 wherein solid nitrosyl hydrogen pyrosulfate is intimately mixed with said cycloalkanecarboxylic acid.

4. The process defined in claim 1 wherein the reaction is carried out at a temperature ranging between substantially 30° C. and 150° C.

5. The process defined in claim 4 wherein said temperature is of the order of 50° C.

6. The process defined in claim 5 wherein said cycloalkanecarboxylic acid has a ring containing from 4 to 12 carbon atoms, inclusive.

7. The process defined in claim 6 wherein said cycloalkanecarboxylic acid is dissolved in a solvent inert with respect to nitrosation of nitrosyl hydrogen pyrosulfate.

8. The process defined in claim 7 wherein said solvent is selected from the group consisting of aliphatic catenary, cycloaliphatic and chlorinated aliphatic hydrocarbons, and nitroparaffins.

9. The process defined in claim 6 wherein the molar ratio of said cycloalkanecarboxylic acid to said nitrosyl hydrogen pyrosulfate is between substantially 0.5 and 2.

10. The process defined in claim 9 wherein said molar ratio is of the order of one.

11. The process defined in claim 9 wherein the reaction is carried out in the absence of free sulfuric acid and sulfur trioxide, further comprising the steps of extracting the reaction mixture with a solvent in which said cycloalkanecarboxylic acid is soluble but the corresponding ω-lactam is insoluble to remove unreacted cycloalkanecarboxylic acid from the reaction mixture, thereafter neutralizing the reaction mixture with a quantity of alkali substantially stoichiometrically equivalent to nitrosyl hydrogen pyrosulfate consumed in the reaction, and thereafter removing said ω-lactam from the reaction mixture by solvent extraction.

12. The process defined in claim 11 wherein the reaction mixture is neutralized and brought to a pH of substantially 7 to 7.5 prior to said solvent extraction.

13. The process defined in claim 11 wherein said cycloalkanecarboxylic acid is selected from the group consisting of cyclopentanecarboxylic acid, cyclohexanecarboxylic acid, cycloheptanecarboxylic acid, cyclooctanecarboxylic acid, cyclohendecanecarboxylic acid, cyclodecanecarboxylic acid, cyclododecanecarboxylic acid, and alkyl-substituted derivatives thereof.

14. The process defined in claim 13 wherein said alkyl-substituted derivatives include 4-methylcyclohexanecarboxylic acid.

References Cited

UNITED STATES PATENTS

| 3,022,291 | 2/1962 | Muench et al. | 260—239.3 |
| 3,114,748 | 12/1963 | Bigot et al. | 260—239.3 |
| 3,119,814 | 1/1964 | Bigot et al. | 260—239.3 |
| 3,211,722 | 10/1965 | Renckhoff et al. | 260—239.3 |

WALTER A. MODANCE, *Primary Examiner.*

ROBERT T. BOND, *Assistant Examiner.*